Figure 1:
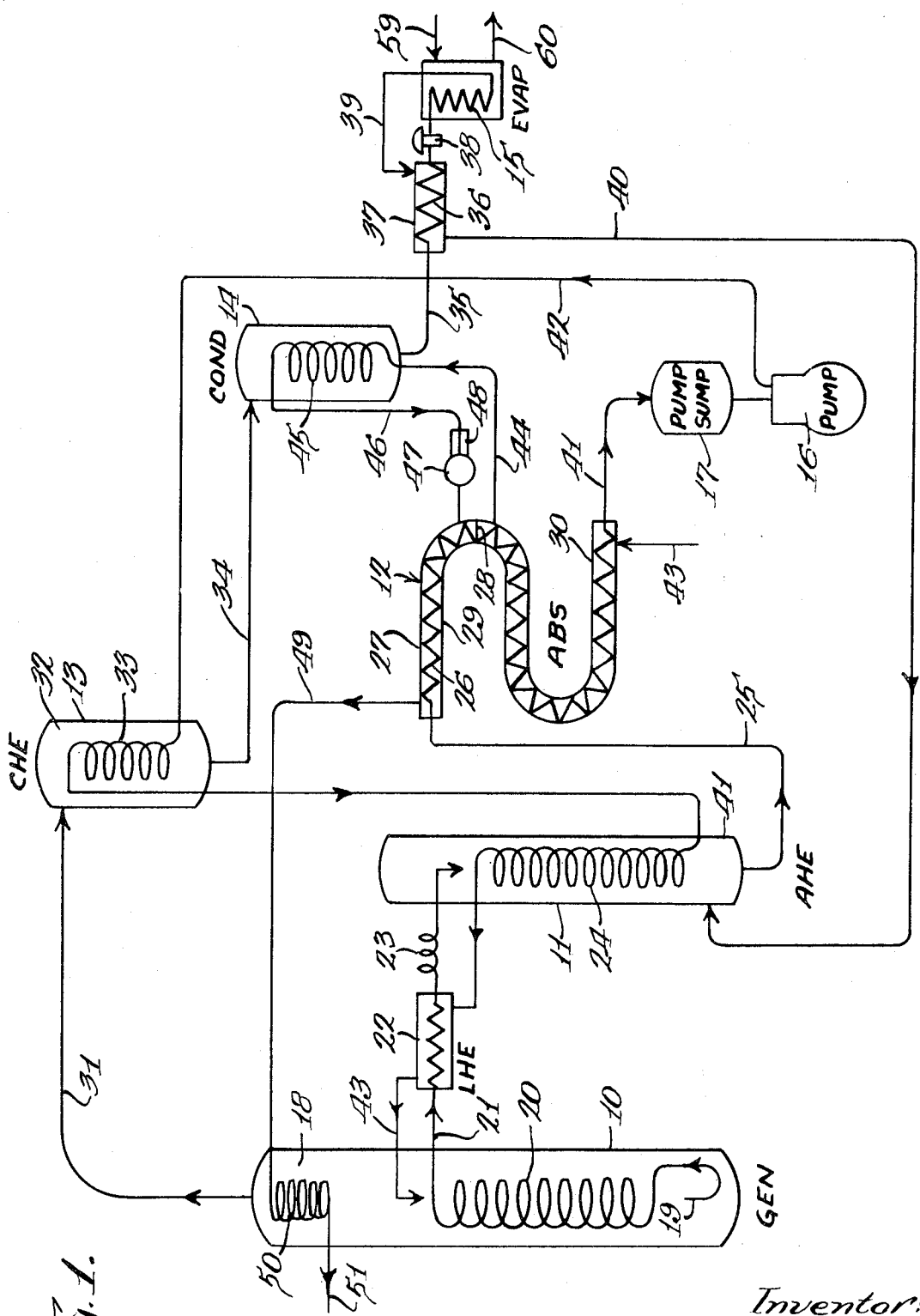

United States Patent

Kruggel

[15] 3,638,452
[45] Feb. 1, 1972

[54] SERIES WATER-COOLING CIRCUIT FOR GAS HEAT PUMP

[72] Inventor: Roy W. Kruggel, St. Joseph, Mich.
[73] Assignee: Whirlpool Corporation
[22] Filed: Oct. 20, 1969
[21] Appl. No.: 867,748

[52] U.S. Cl. .............................................. 62/485, 62/495
[51] Int. Cl. ....................................................... F25b 15/04
[58] Field of Search .................... 62/146, 324, 325, 476, 485, 62/489, 495

[56] References Cited

UNITED STATES PATENTS

| | | | |
|---|---|---|---|
| 2,241,621 | 5/1941 | Shoeld | 62/495 X |
| 423,133 | 3/1890 | Cooke | 62/485 X |
| 2,212,869 | 8/1940 | Tornquist | 62/324 X |
| 2,480,497 | 8/1949 | Meyer | 62/485 X |
| 3,481,150 | 12/1969 | English | 62/476 X |
| 3,516,264 | 6/1970 | Stierlin | 62/476 X |

Primary Examiner—William F. O'Dea
Assistant Examiner—P. D. Ferguson
Attorney—Hofgren, Wegner, Allen, Stellman & McCord

[57] ABSTRACT

A heat pump for an absorption refrigeration system which efficiently extracts heat from the system with coolant liquid flowing in series in heat exchange relation, first with the coolest portion of an absorber, then with the condenser, and then with the hottest portion of the absorber. In the preferred structure, the coolant is then directed through a reflux condenser in the gaseous refrigerant section of the generator.

5 Claims, 2 Drawing Figures

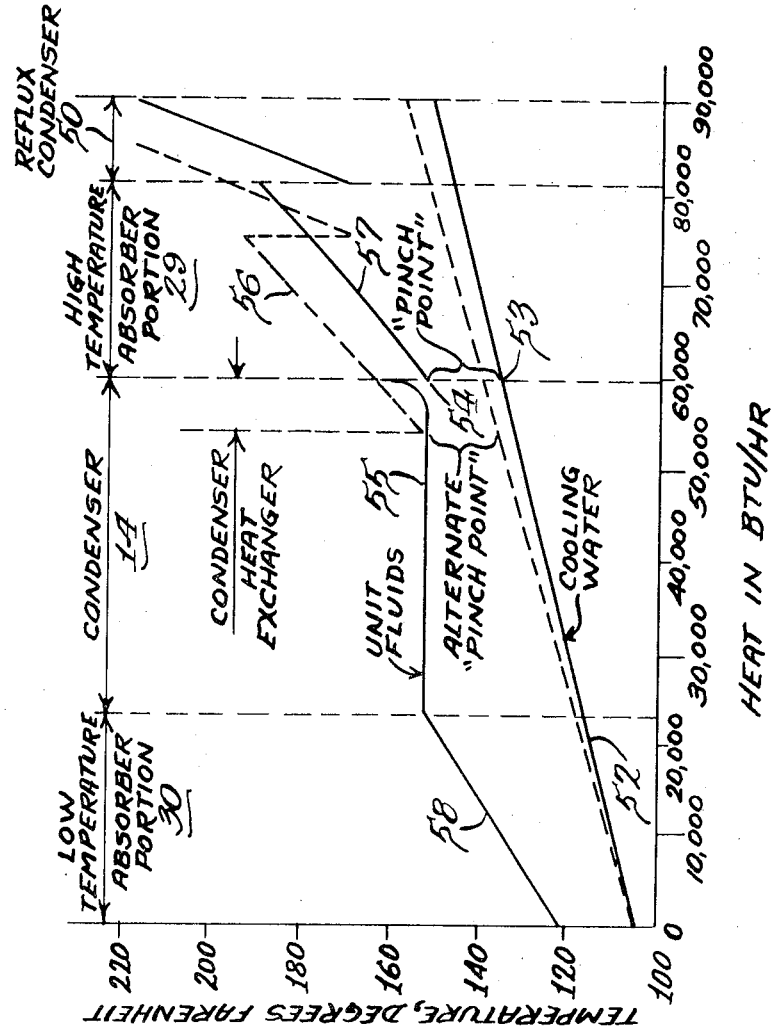

SERIES WATER-COOLING CIRCUIT FOR GAS HEAT PUMP

One of the features of this invention is to provide an improved heat pump comprising an absorption refrigeration system having a generator for evolving refrigerant gas from a rich liquid and thereby producing weak liquid and the refrigerant gas, a condenser for condensing the gas to liquid refrigerant and an absorber having a lower temperature portion and a higher temperature portion for absorbing refrigerant gas into weak liquid to produce rich liquid, a source of liquid coolant, and means for directing the coolant which will, of course, be at its lowest temperature through portions of the absorber and at successively higher temperatures through the higher temperature parts of the system to extract heat therefrom, which heat can be utilized during the cold seasons for heating a dwelling, for example, and which can be dumped into the atmosphere during warm seasons as in the summer.

Another feature of the invention is to provide such a heat pump in which the coolant is permitted to flow from heat-exchange relationship with he condenser only after it has achieved a temperature that is equivalent to the temperature that the coolant would reach on the hottest days of the summer.

A further feature of the invention is to provide such a heat pump in which the liquid coolant is directed through a reflux condenser in the generator in a final heating stage of the coolant.

Another feature of the invention is to provide an absorption refrigeration apparatus in which a heat exchanger is located between the generator and the condenser for cooling the evolved refrigerant gas to approximately its final condensing temperature by heat exchange contact with rich liquid flowing from the absorber to the generator.

Other features and advantages of the invention will be apparent from the following description of one embodiment thereof taken in conjunction with the accompanying drawings. Of the drawings:

FIG. 1 is a flow diagram of one embodiment of an absorption refrigeration system combined with a cooling liquid system for extracting heat from the absorber, condenser and refrigerant gas in the generator, and FIG. 2 is a simplified semidiagrammatic graph illustrating temperature changes of the cooling liquid and the fluids in the refrigeration system.

In the heat pump of this invention the cooling liquid is directed in a path that takes advantage of the different temperature portions of the absorber where heat of absorption has developed and the temperature conditions in the condenser which result from heat of condensation and in the preferred embodiment, as illustrated, in the heat of the gaseous refrigerant in the generator after it has been driven off from the rich liquid. The heat which is picked up by the flowing cooling liquid is used in the customary manner to heat an environment such as a dwelling. In the summer when this heat is not needed, it is dumped into the atmosphere as by providing an air cooling coil and air blower (both not shown).

In the embodiment of FIG. 1, there is provided a generator 10 which is customarily in the form of a vertical cylinder heated adjacent the bottom by a gas flame (not shown) or the like. The system also includes an absorber heat exchanger 11, an absorber 12, a condenser heat exchanger 13, a condenser 14, an evaporator 15, a liquid pump 16, a liquid receiving sump 17, a liquid heat exchanger 22, and precooler 37.

In the system of FIG. 1 the generator 10 evolves gaseous refrigerant which rises into a top space 18 and the resultant weak liquid which is weak in dissolved refrigerant is forced by internal pressure into the entrance end 19 of a vertical heat exchange coil 20 within the generator and from there through a tube 21 of a liquid heat exchanger 22.

From the heat exchanger 22 the weak liquid from generator 10 is directed through a capillary flow restrictor 23 into the absorber heat exchanger 11 which is in the form of a vertical cylinder. This weak liquid enters at the top of the exchanger 11 for flow downwardly over the spaced coils 24 within the exchanger 11 and from the bottom thereof through a line 25 into the top end of a helical internal coil 26 within the absorber 12. A tube 27 surrounds helical coil 26 and is divided by transverse partition 28 into an upper high-temperature section 29 and a lower relatively low-temperature section 30.

The gaseous refrigerant in the upper gas space 18 of the generator 10 is directed through a line 31 into the upper end of a vertical cylinder 32 which with a vertical helical coil 33 therein constitutes a condenser heat exchanger. From the bottom of this cylinder 32 the cooled refrigerant is then directed by line 34 into the upper end of the condenser 14 where the condensation of the refrigerant gas to refrigerant liquid is completed. From the lower end of the condenser 14 the liquid refrigerant flows by way of a line 35 and the coil portion 36 of heat exchanger 37, through an expansion valve 38 and into he evaporator 15.

The liquid refrigerant vaporizes to a gas within the evaporator and by so doing extracts heat from a chilled water stream flowing in lines 59 and 60. The resulting gaseous refrigerant is then directed through a line 39 into the surrounding portion of the heat exchanger 37 and from there through a line 40 and to the bottom 41 of the absorber heat exchanger 11. The gaseous refrigerant that fills the interior of the absorber heat exchanger 11 is in contact with and partially absorbed by the downwardly flowing weak liquid therein provided form the restrictor 23 as previously described and the mixture of absorption liquid and unabsorbed refrigerant gas is then directed through the line 25 to the high-temperature section 29 of the absorber 12. Absorption is completed by the mixture flowing through the coil 26 which extends through the entrance section 29 and through the exit or low-temperature section 30. After the mixture flows from this section 30 the weak liquid has absorbed the refrigerant so that the liquid that exits through the line 41 into the pump sump 17 is now rich liquid or liquid rich in dissolved refrigerant.

The pump 16 then pumps the rich liquid under elevated pressure through a line 42 and from there through the internal coil 33 in the condenser heat exchanger 32, through the coil 24 in the absorber heat exchanger 11, through the liquid heat exchanger 22 where the rich liquid is in heat-exchange contact with the evolving weak liquid leaving generator 10 to pick up heat therefrom and from there through a line 43 into the generator 10 in a customary manner.

In order to utilize the heat from the absorption refrigeration system there is provided a cooling liquid circuit. This cooling liquid is preferably water containing an antifreeze so that liquidity will be maintained at even the lowest temperatures encountered during the operation of the system. This cooling liquid enters the system through a line 43 into the low-temperature section 30 of the absorber. Thus, the cooling liquid is introduced in heat-exchange relationship with the absorber at the coolest portion thereof because the entering liquid itself is at its coolest state.

The coolant liquid then flows through the tube of this low-temperature section 30 to the cross partition 28 and then outwardly through line 44 and through an internal coil 45 within the condenser 14. The liquid thereby picks up the heat of condensation to add to the initial heat of absorption which is picked up in the passage through the absorber section 30 and from the coil 45 flows through a line 46 into the high-temperature section 27 of the absorber 12. This flow is by way of a temperature controlled valve 47 which contains a thermostat indicated at 48 which will reduce flow through the exit line 46 until the temperature of the liquid in this line reaches a certain preselected minimum temperature which will be described further hereinafter.

The coolant liquid from the valve 47 then flows into the high-temperature section 29 of absorber 12 and from there through a line 49 into and through a reflux condenser coil 50 in the vapor space 18 of the generator 10. The heated liquid is thereupon directed through a line 51 away from the refrigeration system.

With this arrangement of cooling liquid flow through the coolest section of the absorber, then through the condenser, then through the highest temperature section of the absorber and preferably finally through the reflux condenser coil, the extraction of heat from the system is efficiently accomplished by passing the coolant in contact with progressively hotter systems components so that this heat can be utilized as needed at an exterior area such as to heat a dwelling in the winter.

In order to further aid the efficiency of the cooling arrangement in the illustrated embodiment the temperature controlled valve 47 is provided. This serves to maintain the temperature of the coolant leaving the condenser 14 at a preselected high value such as 130° F. This improves the efficiency of the system as it maintains the pressure conditions within the condenser at a desired high value regardless of the temperature of the ambient surrounding the condenser. Thus, in one example, the valve 47 could only open fully when the temperature of the coolant in line 46 was at least 130° F. which was equivalent to a very high ambient temperature. This prevents the pressures within the system from dropping under low ambient temperature conditions such as are encountered in winter.

Another factor that improves the efficiency of the system is the provision of the condenser heat exchanger 13. This serves to cool the gaseous refrigerant as it first leaves the generator 10 through the line 31. Because this refrigerant has been boiled from the rich liquid in the generators and contains some absorbent vapor, it is at a relatively high temperature. The gas is cooled in the heat exchanger 13 by heat exchange contact with the relatively cool rich liquid flowing from the pump 16 on its way to the generator by way of the absorber heat exchanger 11 and the liquid heat exchanger 22. This heat exchange serves to preheat the rich liquid which tends to conserve gaseous fuel at the generator. The condenser heat exchanger also performs a function that is beneficial to heating as hereinafter described in connection with FIG. 2.

FIG. 2 illustrates diagrammatically the changing temperature conditions of the cooling liquid and the fluids within the absorption system. In this graph the abscissa is expressed as heat extracted in B.t.u. per hour and the ordinate is expressed in degrees Fahrenheit. As can be seen from the cooling liquid or cooling waterline 52 on the graph, the temperature of the coolant increases as it picks up heat from the low-temperature absorber portion 30, the condenser 14, the high-temperature absorber portion 29 and finally from the reflux condenser coil 50.

It has been found that for most efficient operation of the system the temperature of the cooling liquid or water leaving the condenser as expressed by the point 53 should be a preselected difference from the temperature of the absorption fluids within the system at the entrance to the high-temperature portion of the absorber expressed by the point 54. A temperature difference that has been found to be very effective (identified as "pinch point") has been found to be about 7° F. Lower temperature differences are possible by increasing the size of the condenser and absorber. The changing temperature conditions of the fluids within the system are indicated by the graph lines 55, 57 and 58. By utilizing the condenser heat exchanger 13 the temperature conditions of the fluids within the high-temperature absorber portion 29 can be shifted to the values illustrated by the broken line temperature graph 56 from the conditions that would normally prevail as indicated by the solid line 57. This can result in an increased temperature differential at the "pinch point" and smaller condenser and absorber heat exchanger sizes. Alternately, it can result in higher leaving water temperatures by maintaining the same "pinch point" differential temperature.

I claim:

1. A heat pump, comprising: an absorption refrigeration system having a generator for evolving refrigerant gas from a solution rich in dissolved refrigerant and producing a solution weak in dissolved refrigerant, a condenser for condensing said gas to liquid refrigerant and an absorber having a lower temperature portion and a higher temperature portion for absorbing refrigerant gas into weak liquid to produce rich liquid; a source of liquid coolant; a means for directing said coolant, in series, in heat exchange relation with said absorber lower temperature portion, then said condenser, and then said absorber higher temperature portion to extract heat of absorption and condensation from said system.

2. The heat pump of claim 1 wherein there are provided valve means substantially restricting flow of said coolant from said condenser at a coolant temperature less than a preselected minimum.

3. The heat pump of claim 2 wherein said minimum temperature substantially simulates the temperature of said coolant under unrestricted condition at high ambient air temperature.

4. The heat pump of claim 1 wherein there are provided a reflux condenser in said generator in heat-exchange relationship with said evolved gas in the generator, and means for directing said coolant in heat-exchange relation with said reflux condenser subsequent to extracting heat of absorption from said absorber.

5. The heat pump of claim 4 wherein there are provided valve means substantially restricting flow of said coolant from said condenser at a coolant temperature less than a preselected minimum.

* * * * *